3,025,177
SEALANT COMPOSITION
Roland J. Peffer, White Bear Lake, Minn., assignor to Minnesota Mining and Manufacturing Company, St. Paul, Minn., a corporation of Delaware
No Drawing. Filed Aug. 17, 1959, Ser. No. 833,917
7 Claims. (Cl. 106—287)

The present invention relates to a fluid composition useful as a sealant. In one aspect, this invention relates to a thermally stable hydrocarbon resistant grease or putty. In still another aspect, this invention relates to a fluorine-containing fluid composition.

In industry, various sealants are used for sealing vessels and conduits, etc., which sealants must be injected into grooves and crevices to form the seal. These sealants are often used in environments involving high temperatures and solvent action of the material to be contained in the vessel or conduit. It has been difficult, if not impossible, to supply the proper type of sealant which is injectable and at the same time thermally stable and solvent resistant.

An object of this invention is to provide a thermally stable solvent-resistant fluid composition.

Another object of this invention is to provide a fluorine-containing grease or putty useful as a sealant.

Still another object of this invention is to provide a sealant which continues to be fluid and mobile after use at high temperatures and in the presence of solvents.

Various other objects and advantages of the present invention will become apparent to those skilled in the art from the accompanying description and disclosure.

The composition of this invention comprises a composition of a grease or putty-like consistency capable of being injected into grooves and crevices under ambient conditions. This composition constitutes an admixture of a low molecular weight, normally liquid-to-waxy polymer of a fluorinated alkyl acrylate and a polymer of a polyfluorinated dialkyl siloxane. In particular, the sealant composition comprises a normally liquid polymer of 1,1-dihydroperfluorobutyl acrylate or 1,1-dihydroperfluoropropyl acrylate, and a low viscosity polymer of trifluoropropylmethyl siloxane having a paste-like consistency. The inherent viscosity of the normally liquid polymer of 1,1-dihydroperfluorobutyl acrylate is usually between about 0.15 and about 0.20, preferably between about 0.16 and about 0.18. The inherent viscosity of the low molecular weight polymer of trifluoropropylmethyl siloxane is between about 0.35 and about 0.55. These two components are admixed such that as between the components the polymer of the fluorinated alkyl acrylate constitutes the major constituent by weight. Preferably, the weight ratio of the polymer of the fluorinated alkyl acrylate to the polymer of the trifluoropropylmethyl siloxane is between about 2.5:1 and about 3.5:1. In this ratio of the two components there is effected a synergistic composition with regard to thermal stability and solvent resistance.

The structure of the trifluoropropylmethyl siloxane polymer includes the following repeating monomeric units:

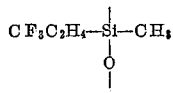

In addition to the polymeric components set forth above, the composition also includes an inorganic heat stable filler, such as titanium dioxide, and silicon dioxide, as a thickener. The combination of the low molecular weight polymers and the thickener assures extrudability of the sealant even after exposure under high temperatures for a considerable length of time. The proportion of the filler to the combined polymers above is between about 0.2:1 to about 0.75:1 by weight. The filler should have a pH of about 6 to 8; otherwise, it may cause cross-linking or interacting with the polymers of the composition.

In order to render the composition particularly inert, it is preferable to use an antioxidant or stabilizer. The sulfur-containing stabilizers are preferred as they are inert to the polymers and do not cause cross-linking. A suitable antioxidant is 4,4'-dithiodimorpholine. The composition may also include, in addition to the inorganic heat stable filler, carbon black as a filler and pigment.

The above composition of matter is of a putty-like consistency and readily adaptable for high pressure injection into grooves surrounding the fuel cavity of many aircraft fuel tank designs. The sealant composition assures a leak-proof seal against hydrocarbon jet fuels as well as the vapor pressure developed in the tank resulting from the aerodynamic heating during flight. The sealant composition of this invention is non-curing and inert and resists degradation by hydrocarbon fuels and long term exposure to temperatures as high as 350 to 400° F. The sealant shows good adhesive properties to stainless steel and aluminum, assuring a good seal.

The normally liquid polymer of the fluorinated alkyl acrylate is prepared by polymerizing the fluorinated alkyl acrylate at a temperature of from 40 to 100° C. for a period of at least twenty hours in the presence of a chain transfer agent, such as dodecyl mercaptan or chloroform, using an organic peroxide as a catalyst. Details of the various types of fluorinated alkyl acrylates and the method for the preparation of the low molecular weight polymers thereof are disclosed in U.S. Patent No. 2,642,416, issued June 16, 1953. Therefore, reference to this patent may be had for further information regarding the fluorinated alkyl acrylates and the preparation of the fluorinated alkyl acrylate homopolymers.

The fluorinated dialkyl siloxane polymer is prepared by polymerizing a dialkyl siloxane containing fluorine, such as trifluoropropylmethyl siloxane, or the cyclic trimer or cyclic tetramer thereof, at a temperature below 200° C. in the presence of an alkali metal hydroxide as a catalyst; preferably, at a temperature between about 130 and about 150° C. If the viscosity of the homopolymer thus produced is too high for use in the composition of this invention, the viscosity of the homopolymer of the siloxane can be reduced by heating the siloxane polymer at a temperature between about 450 and about 550° F. for a period of at least 60 hours to reduce the viscosity such that the inherent viscosity of the material is between about 0.4 and about 0.5. The homopolymer of trifluoropropylmethyl siloxane in admixture with about 20 weight percent silicon dioxide as a filler and about 5 weight percent of $F_2O_3$ as a stabilizer is available on the open market. This material, having an inherent viscosity in methylethyl ketone between about 0.6 and about 0.8 with a 25 percent gel content, is heated as above described to reduce the inherent viscosity thereof to about 0.4 to about 0.5. In determining the viscosity, the gel was removed by centrifuging. The homopolymer containing the filler having the reduced viscosity is of a paste-like consistency.

The following examples are offered as a better understanding of the preparation of the present sealant composition and the properties exhibited thereby. It is to be understood that the examples are not to be considered unnecessarily limiting the invention.

EXAMPLE I

About 75 parts by weight of the liquid homopolymer of 1,1-dihydroperfluorobutyl acrylate is admixed with about 25 parts by weight of a homopolymer of trifluoropropylmethyl siloxane in a Baker-Perkins mixer followed by thorough blending of the polymers. Thereafter, about 50 parts by weight of titanium dioxide, about 2 parts by weight of carbon black, and about 1.5 parts by weight of 4,4'-dithiodimorpholine (antioxidant) is admixed into the mixer and further blended with the polymers. Blending is continued until a homogeneous mixture is obtained.

The liquid homopolymer of 1,1-dihydroperfluorobutyl acrylate used in the above composition had an inherent viscosity of about 0.17. The homopolymer of trifluoropropylmethyl siloxane had an inherent viscosity of about 0.4 and was obtained by heating fluorinated polysiloxane, a homopolymer of trifluoropropylmethyl siloxane containing silicon dioxide and $F_2O_3$, for 72 hours at 500° F.

The sealant composition of the above has a weight loss on heat aging for 168 hours at 400° F. of 13.4 percent. The weight loss of the above composition on immersion in jet fuel for 168 hours at 140° F. and dried 72 hours at 120° F. was 0.17 percent. The sealant composition exhibited good adhesion to Alclad aluminum and stainless steel. The initial injection properties of the sealant are satisfactory and the sealant remains reinjectable even after 168 hours of exposure at 400° F. to dry heat.

EXAMPLE II

The following is a comparison between various compositions of the above ingredients of Example I and with the polymeric constituents alone, which comparison indicates the synergistic effect of combining the polymers in the preferred ratio of this invention, e.g., a weight ration of fluorinated alkyl acrylate polymer to fluorinated dialkyl siloxane polymer of about 3:1.

*Heat Resistance Data*

|  | Trifluoropropyl-methyl siloxane homopolymer (heat treated at 500° F. for 60 hours) | 1,1-dihydroperflu-orobutyl acrylate homopolymer |
| --- | --- | --- |
| Percent Wt. Loss—72 hours at 400° F | 4.5 | 18.0 |

As a result of these heat resistance values for the two polymers, compounded sealants were made of polymer blends to determine the blend which would result in the best heat and jet fuel resistance.

*Sealant Formulations*

[Parts by weight]

| Composition | A | B | C |
| --- | --- | --- | --- |
| 1,1-dihydroperfluorobutyl acrylate homopolymer | 50 | 25 | 75 |
| Trifluoropropylmethyl siloxane homopolymer | 50 | 75 | 25 |
| Titanium Dioxide | 50 | 50 | 50 |
| 4,4'-dithiodimorpholine | 1 | 0.5 | 1.5 |

The 4,4'-dithiodimorpholine is used as a heat stabilizer for the trifluoropropylmethyl siloxane homopolymer—two parts per 100 parts of polymer.

*Heat and Jet Fuel Resistance Data*

| Composition | A | B | C |
| --- | --- | --- | --- |
| Percent Wt. Loss 168 Hrs. at 350° F | 6.9 | 6.4 | 5.3 |
| Percent Wt. Loss—72 Hrs. in Jet Fuel at 150° F.+Drying 16 Hrs. at 160° F | 1.3 | 1.5 | 1.2 |

The comparative heat resistance of the trifluoropropylmethyl siloxane homopolymer and 1,1-dihydroperfluorobutyl acrylate homopolymer would indicate that composition B should possess the least weight loss upon heat aging. However, these data indicate that composition C, employing a 3/1 weight ratio of 1,1-dihydroperfluorobutyl acrylate polymer to trifluoropropylmethyl siloxane polymer, has better heat resistance than the compositions in which larger proportions of trifluoropropylmethyl siloxane were used.

Various minor modifications and alterations in proportions and viscosity of the ingredients will become obvious to those skilled in the art from the teachings of this invention which modifications and alterations should be construed as within the scope of the invention.

Having described my invention, I claim:

1. A composition of matter consisting essentially of an admixture of a low molecular weight polymer of a fluorinated alkyl acrylate, a low viscosity polymer of a fluorinated dialkyl siloxane, and a filler having a pH between about 6 and about 8 in which the weight ratio of acrylate polymer to siloxane polymer is greater than 1:1 and in which the filler is between about 0.2:1 and about 0.75:1 by weight of the combined polymers.

2. A sealant composition consisting essentially of an admixture of a low molecular weight fluorinated alkyl acrylate homopolymer and a low viscosity fluorinated dialkyl siloxane homopolymer, and a filler having a pH between about 6 and about 8 in which the weight ratio of acrylate polymer to siloxane polymer is greater than 1:1 and in which the filler is between about 0.2:1 and about 0.75:1 by weight of the combined polymers.

3. The sealant composition of claim 2 in which said filler is titanium dioxide.

4. The sealant composition of claim 2 in which said filler is silicon dioxide.

5. A sealant composition consisting essentially of an admixture of liquid 1,1-dihydroperfluorobutyl acrylate homopolymer, a low viscosity trifluoropropylmethyl siloxane homopolymer, and an inorganic heat stable filler having a pH between about 6 and about 8 in which the weight ratio of acrylate polymer to siloxane polymer is greater than 1:1 and in which the filler is between about 0.2:1 and about 0.75:1 by weight of the combined polymers.

6. A sealant composition consisting essentially of an admixture of a liquid homopolymer of 1,1-dihydroperfluorobutyl acrylate, a low viscosity homopolymer of trifluoropropylmethyl siloxane, titanium dioxide and a sulfur-containing stabilizer, the weight ratio of acrylate polymer to siloxane polymer being between about 2.5:1 and about 3.5:1 and the weight ratio of titanium dioxide to combined polymers being between about 0.2:1 and about 0.75:1.

7. The sealant composition of claim 6 in which said stabilizer is 4,4'-dithiodimorpholine.

References Cited in the file of this patent

UNITED STATES PATENTS

| 2,471,010 | Rector | May 24, 1949 |
| 2,642,416 | Albrecht et al. | June 16, 1953 |
| 2,833,664 | Knapp | May 6, 1956 |

FOREIGN PATENTS

| 595,565 | Great Britain | Dec. 9, 1947 |
| 1,033,410 | Germany | July 3, 1958 |